United States Patent [19]
Yamaoka et al.

[11] Patent Number: 5,616,420
[45] Date of Patent: Apr. 1, 1997

[54] LAMINATE FILM

[75] Inventors: Ryuso Yamaoka; Yoshinori Ishii, both of Kusatsu; Kunio Kondo, Moriyama; Kazuto Wakita, Fujisawa; Iwao Tsurutani, Chiba, all of Japan

[73] Assignees: Gunze Limited, Ayabe; Ube Industries, Ltd., Ube, both of Japan

[21] Appl. No.: 297,925

[22] Filed: Aug. 31, 1994

[30] Foreign Application Priority Data

Sep. 6, 1993 [JP] Japan .................................. 5-220938

[51] Int. Cl.⁶ .......................................................... B32B 27/08
[52] U.S. Cl. .......................... 428/515; 428/500; 428/516; 428/517; 428/520
[58] Field of Search ............................................... 428/520, 517, 428/500, 516, 515; 525/19 F

[56] References Cited

U.S. PATENT DOCUMENTS

| | | | |
|---|---|---|---|
| 4,322,465 | 3/1982 | Webster | 428/194 |
| 4,350,795 | 9/1982 | Bohm et al. | 525/194 |
| 4,440,815 | 4/1984 | Zoenorodi et al. | 428/35 |
| 4,479,989 | 10/1994 | Mahal | 428/35 |
| 4,734,456 | 3/1988 | Motomatsu et al. | 525/74 |

FOREIGN PATENT DOCUMENTS

| | | |
|---|---|---|
| 0380145 | 8/1990 | European Pat. Off. . |
| 0533493 | 3/1993 | European Pat. Off. . |
| 0564206 | 10/1993 | European Pat. Off. . |
| 5-77371 | 3/1993 | Japan . |
| 2023497 | 1/1980 | United Kingdom . |

*Primary Examiner*—Stevan A. Resan
*Attorney, Agent, or Firm*—Armstrong, Westerman, Hattori, McLeland, & Naughton

[57] ABSTRACT

Disclosed are a laminate film having at least three layers, the three layers being (A) an intermediate layer and (B) two outer layers, the intermediate layer (A) being composed of a resin composition comprising 20 to 100% by weight of an amorphous polyolefin containing at least 50% by weight of a propylene and/or butene-1 and 80 to 0% by weight of a crystalline polypropylene, and the two outer layers (B) being composed of a resin composition comprising a polyolefin and a thermoplastic styrene elastomer, and a laminate film having at least three layers, the three layers being (A) an intermediate layer and (B) two outer layers, the intermediate layer (A) being composed of a resin composition comprising 20 to 100% by weight of an amorphous polyolefin containing at least 50% by weight of a propylene and/or butene-1 and 80 to 0% by weight of a crystalline polypropylene, and the two outer layers (B) being composed of a resin composition comprising a propylene resin and a thermoplastic styrene elastomer.

4 Claims, 1 Drawing Sheet

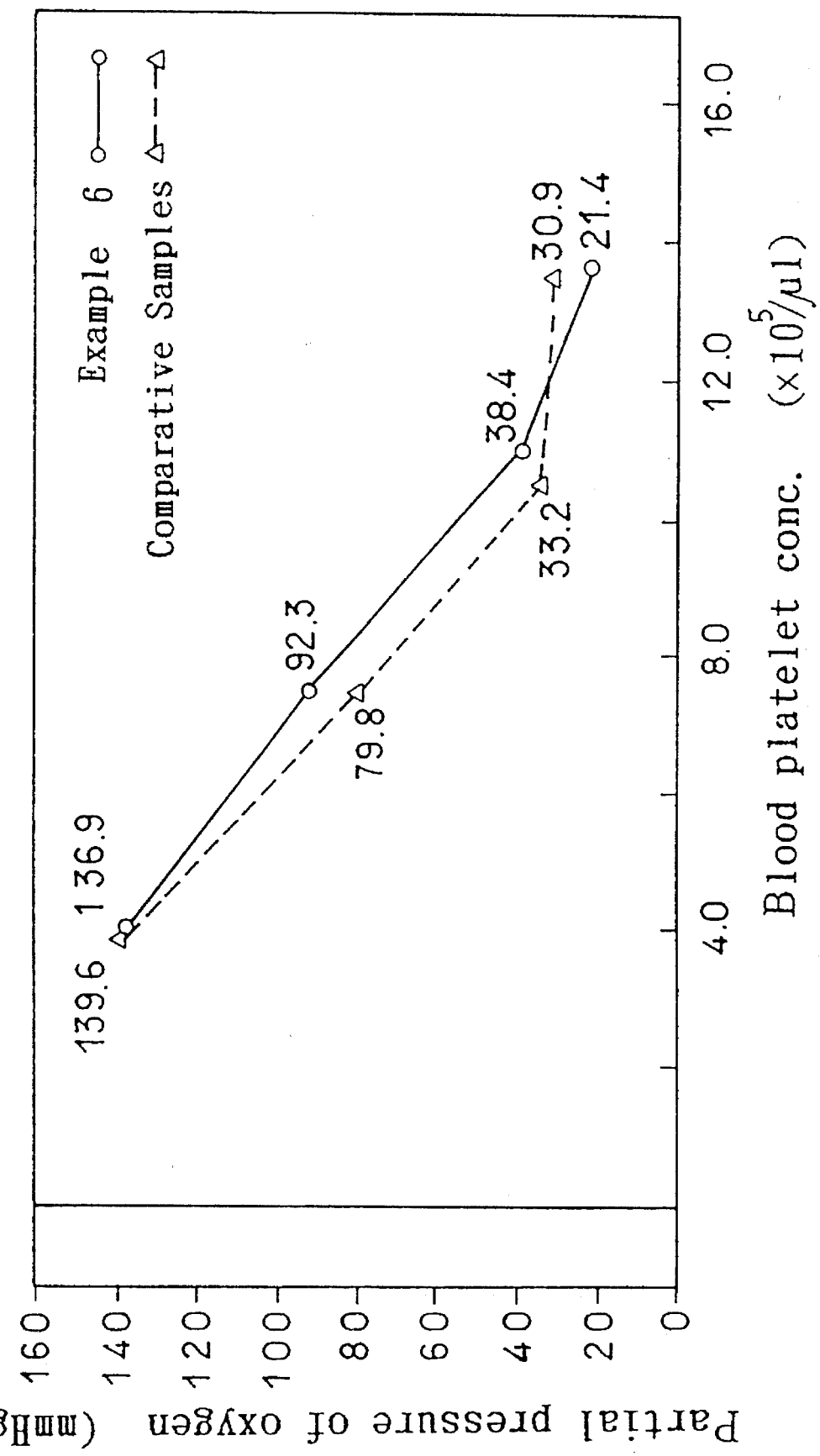

LAMINATE FILM

The present invention relates to a laminate film or sheet which is excellent in drop impact strength, heat sealability, hygienic qualities and flexibility.

Conventionally non-rigid polyvinyl chloride films have been widely used because of their transparency, mechanical strength and flexibility in the fields of food packaging, medical instruments, industrial materials, etc. Films of ethylene/vinyl acetate copolymers, ultra-low density polyethylenes and the like have been used for various purposes for their flexibility, transparency, hygienic qualities, etc.

However, non-rigid polyvinyl chloride films used for medical instruments and the like have posed hygienic problems due to a large amount of plasticizers present therein. Further, there has been a demand in this and other countries for materials usable in place of non-rigid polyvinyl chloride films since the films erode the furnace in calcining waste films for disposal. Such films need a large thickness to make up for the low drop impact strength of the films, and thus the transparency of the films is inevitably adversely affected. Typical non-rigid films analogous to the non-rigid polyvinyl chloride films include ethylene/vinyl acetate copolymers, ultra-low density polyethylenes, etc. These non-rigid films have a problem. Since the non-rigid films of large thickness are poor in transparency, gloss and the like, those of small thickness are inevitably used although unsatisfactory in drop impact strength, etc. A further problem is that these films are difficult to use as heat-resistant materials for bags for preserving blood platelets, etc. which require heat resistance.

Improvements over such films have been proposed in Japanese Unexamined Patent Publication No.77,371/1993 which discloses a three-layer laminate film comprising an intermediate layer of an amorphous polyolefin or a mixture of said amorphous polyolefin and a crystalline polypropylene in a specific ratio and two outer layers of crystalline polypropylene. It is known that such three-layer films are suitably usable as packaging films, films for medical applications, etc. Yet, due to their low drop impact strength, the films have a problem. When used as packaging materials for liquids or heavy contents or for medical containers such as bags for containing parenteral solutions or for blood or bags for preserving blood platelets, etc, the films may become cracked or fractured and will leak during transport.

It is an object of the present invention to provide a novel laminate film free of the foregoing prior art problems.

It is another object of the invention to provide a laminate film which is excellent in drop impact strength, transparency, gloss, heat sealability, flexibility, hygienic qualities, etc.

It is a further object of the invention to provide a laminate film which can be used for various applications as packaging materials for foods, textiles, etc., medical materials such as bags for containing parenteral solutions or blood, bags for preserving blood platelets, etc., stretched films, metal-protective films, substrates for adhesive tapes, building materials in fields of civil engineering and construction and so on.

It is a still further object of the invention to provide a laminate film which can be preferably used as surface-protective films for metal plates, plastic plates, glass plates and the like, cylindrical articles, etc.

These and other objects of the invention will become more apparent from the following description.

According to one aspect of the present invention, there is provided a laminate film having at least three layers, the three layers being (A) an intermediate layer and (B) two outer layers, the intermediate layer (A) being composed of a resin composition comprising 20 to 100% by weight of an amorphous polyolefin containing at least 50% by weight of a propylene and/or butene-1 and 80 to 0% by weight of a crystalline polypropylene, and the two outer layers (B) being composed of a resin composition comprising a polyolefin and a thermoplastic styrene elastomer.

According to another aspect of the invention, there is provided a laminate film having at least three layers, the three layers being (A) an intermediate layer and (B) two outer layers, the intermediate layer (A) being composed of a resin composition comprising 20 to 100% by weight of an amorphous polyolefin containing at least 50% by weight of a propylene and/or butene-1 and 80 to 0% by weight of a crystalline polypropylene, and the two outer layers (B) being composed of a resin composition comprising a propylene resin and a thermoplastic styrene elastomer.

The inventors of the present invention conducted extensive research to overcome the foregoing prior art problems and found the following. The foregoing objects of the invention can be achieved by a laminate film having at least three layers, the three layers being (A) an intermediate layer and (B) two outer layers, the intermediate layer (A) comprising an amorphous polyolefin of specific formulation or a mixture of said amorphous polyolefin and a crystalline polypropylene in a specific ratio, and the two outer layers (B) comprising a polyolefin and a thermoplastic styrene elastomer, and that the laminate film of the same formulation as said film with the exception of containing a propylene resin in the layer (B) as the polyolefin is suitable for use as a bag for preserving blood platelets.

The present invention has been completed based on these novel findings.

The laminate product of the present invention may be a film, sheet or the like in the form of a web, or may be provided as a molded article in any optional shape, such as containers produced by blow-forming or by deep draw.

The amorphous polyolefin used for the layer (A) is an amorphous olefin polymer containing at least 50% by weight of a propylene and/or butene-1. For example, an amorphous polypropylene or polybutene-1 or a copolymer of propylene or butene-1 with other α-olefin can be used as such polymers. If the amorphous polyolefin contains less than 50% by weight of a propylene and/or butene-1, the polyolefin is less compatible with the crystalline polypropylene, and hence undesirable.

The term "amorphous polyolefin" used herein refers to a polymer containing up to 70% by weight, preferably up to 60% by weight, of insoluble matter as determined by Soxhlet extraction method involving boiling n-heptane. In this case, if an insoluble content is more than 70% by weight, a less proportion of amorphous portion is present, and the contemplated flexibility is not imparted to the obtained film.

The amorphous polyolefin of the layer (A) has a number average molecular weight of preferably 1,000 to 200,000, more preferably 1,500 to 100,000. If the number average molecular weight exceeds 200,000, it is difficult to mold a film, whereas if it is less than 1,000, a reduced mechanical strength is given to the film. In the practice of the invention, said amorphous polyolefins can be used singly or in mixture with each other.

The amorphous polyolefin can be an atactic polypropylene produced as a by-product in the preparation of crystalline polypropylenes or can be one prepared from starting materials for this purpose. The copolymer of propylene or butene-1 with other α-olefin can be one prepared from the starting materials in a manner to incorporate the specific proportions of propylene and/or butene-1 into the copolymer.

The amorphous polyolefin to be used can be prepared by polymerizing the monomer(s) in the presence or absence of hydrogen using triethylaluminum and a catalyst having titanium supported on magnesium chloride. In view of stability in a supply of starting materials and stability of properties, it is preferred to use the specific amorphous polyolefin prepared for this purpose. Commercially available products properly selected can be used.

Examples of the amorphous polyolefin to be used for the layer (A) are polymers having the specific characteristics, e.g. the above-defined propylene content, and include polypropylene, propylene/ethylene copolymers, propylene/butene-1 copolymers, propylene/butene-1/ethylene terpolymers, propylene/hexene-1/octene-1 terpolymers, propylene/hexene-1/4-methylpentene-1 terpolymers, etc. which predominantly contain a propylene.

Useful amorphous polyolefins for the layer (A) are also polymers having the specific characteristics, e.g. the above-defined butene-1 content, and include polybutene-1, butene-1/ethylene copolymers, butene-1/propylene copolymers, butene-1/propylene/ethylene terpolymers, butene-1/hexene1/octene-1 terpolymers, butene-1/hexene-1/4-methylpentene-1 terpolymers, etc. which predominantly contain butene-1.

Propylene/ethylene copolymers preferable as the amorphous polyolefin of the layer (A) are those containing 0 to 30% by weight, preferably 1 to 20% by weight, of ethylene. If the ethylene content is more than 30% by weight, the obtained film is too soft, but the ethylene content is not limited thereto.

A propylene/butene-1 copolymer useful as the amorphous polyolefin of the layer (A) is either a copolymer predominantly containing propylene or a copolymer predominantly containing butene-1. Both of such copolymers have a high tensile elongation and a great cohesive power and are therefore suitable for use as the amorphous polyolefin of the layer (A). Stated more specifically, a commercial product such as "REXTAC" (trade name, a product of Rexene Co., Ltd., U.S.) can be used.

Crystalline polypropylenes useful for the layer (A) include polypropylenes commercially available as extrusion-, injection- or blow-molding materials and isotactic polypropylenes remaining insoluble matters after extraction by boiling n-hexane. Useful crystalline polypropylenes can be homopolymers of propylene or copolymers of stereospecific isotactic polypropylene with other α-olefin.

Commercially available products and products prepared for this purpose are usable as the crystalline polypropylene. The process for preparing the crystalline polypropylene is not specifically limited and suitably selected conventional processes are employable.

The α-olefin useful for the copolymer of crystalline polypropylene with α-olefin includes, for example, α-olefin having 2 to 8 carbon atoms. Preferred examples of such α-olefin are ethylene, butene-1, pentene-1, hexene-1, heptene-1, octene-1, etc. Among them, ethylene and butene-1 are more preferred.

Preferred examples of the crystalline polypropylene which can be used in the invention are homopolymers of propylene, propylene/ethylene random copolymers or block copolymers containing up to 30% by weight, preferably 1 to 25% by weight, of ethylene, propylene/butene-1 random copolymers or block copolymers containing up to 20% by weight of butene-1, etc. Among them, ethylene or butene-1/propylene copolymers are preferred in view of the purposes of films or sheets formed from the resin composition of the invention. These crystalline polypropylenes of the layer (A) can be used singly or in mixture with each other.

The amorphous polyolefin and crystalline polypropylene for the layer (A) in the present invention may be modified products. The amorphous polyolefins and crystalline polypropylenes exemplified above can be products modified with unsaturated carboxylic acids such as acrylic acid, methacrylic acid, maleic acid, fumaric acid or itaconic acid and/or their derivatives such as their esters, acid anhydrides and metal salts, unsaturated amides, amino compounds, glycidyl methacrylate, hydroxy methacrylate, etc. Among these modified products, these polymers modified with a maleic anhydride or itaconic anhydride are preferred and those modified with maleic anhydride are more preferred.

Processes for preparing the resin composition comprising the amorphous polyolefin and crystalline polypropylene are not specifically limited, and include processes conventionally used for preparing polypropylene compositions, for example, those comprising heating the materials and kneading the melt using a kneading machine such as kneaders, Banbury mixer, rolls, single- or twin-screw extruders, etc.

In the practice of the invention, the resin composition for the layer (A) may optionally contain additives, fillers, etc. such as heat resistance stabilizers, antioxidants, light stabilizers, antistatic agents, lubricants, antiblocking agents, nucleating agents, flame retardants, pigments or dyes, calcium carbonate, calcium sulfate, barium sulfate, magnesium hydroxide, mica, talc, clay, etc. Further, other thermoplastic resins, thermoplastic elastomers, rubbers, etc. can be optionally added. Crosslinked products thereof can also be used. To impart flame retardancy to the film, magnesium hydroxide or magnesium carbonate can be added in an amount of 20 to 60 parts by weight relative to the multi-layer film.

The resin composition of the layer (A) comprises the amorphous polyolefin alone or in mixture with the crystalline polypropylene, and more specifically, comprises 20 to 100% by weight, preferably 25 to 100% by weight, of the amorphous polyolefin and 80 to 0% by weight, preferably 75 to 0% by weight, of the crystalline polypropylene. If the amorphous polyolefin is less than 20% by weight, a sufficient flexibility is not imparted to the film.

Polyolefins which can be used for the layer (B) are not specifically limited and include, for example, ethylene resins, propylene resins, butene resins, modified products thereof, mixtures thereof, etc.

The ethylene resins include polyethylenes such as low density polyethylenes, linear, low density polyethylenes, ultra-low density polyethylenes, middle density polyethylenes, high density polyethylenes, copolymers predominantly containing an ethylene, namely copolymers or multicomponent polymers comprising an ethylene and at least one comonomer selected from propylene, butene, pentene, hexene, heptene, octene and other olefins, vinyl acetate, vinyl propionate and other vinyl esters, methyl acrylate, ethyl acrylate, methyl methacrylate, ethyl methacrylate and other unsaturated carboxylic acid esters, and metal salts of unsaturated carboxylic acids such as acrylic acid, methacrylic acid, maleic acid, maleic anhydride, etc. Examples of metals for metal salts are zinc, sodium, magnesium, etc. Of course, two or more polymers or copolymers are usable in mixture. Modified products of these ethylene resins can be used, as is the case with the layer (A).

While these ethylene resins are usable without specific limitation, those having a Shore D hardness of less than 50 at 23° C. are preferred in view of the flexibility of the laminate film as a whole.

The ethylene resins having a Shore D hardness of less than 50 are, for example, low density polyethylenes, linear low density polyethylenes, ultra-low density polyethylenes, ethylene/vinyl acetate copolymers, ethylene/ethyl acrylate copolymers, ionomers, etc.

The propylene resins to be used are not specifically limited and include the crystalline polypropylenes exemplified above for the layer (A). Propylene random copolymers are preferably used since they cause the film to exhibit the characteristics of non-rigid films. Yet useful propylene resins are not limited to such copolymers, and are suitably selected for use in conformity with the purposes. The laminate film of the present invention must be heat-resistant when used for bags for containing a parenteral solution, bags for preserving blood platelets, etc. to be heat-treated, for example, by steam sterilization. Consequently polypropylene homopolymers and polypropylene copolymers of relatively high melting point are preferably used for said applications, but they are not essentially used. The bags for containing a parenteral solution and bags for preserving blood platelets are required to have heat resistance because the bags must withstand sterilization treatment at a high temperature (e.g. 121° C.). Also for this reason, the resin composition for the layer (B) preferably has a Vicat softening point of at least 50° C. If the softening point is lower than 50° C., the laminate film may be deformed during high temperature sterilization and the film of the bag may cause adhesion of internal sides to each other by fusion. The softening point of the composition is not limited to at least 50° C., and can be lower depending on the use.

The above-exemplified polyolefins of the layer (B) can be used singly or in mixture with each other.

Thermoplastic styrene elastomers which can be used for the layer (B) are not specifically limited and include thermoplastic styrene/diene elastomers. Among them, block copolymer elastomers and random copolymer elastomers are preferred. Useful styrene components are, for example, styrene compounds such as styrene, α-methylstyrene, p-methylstyrene, vinylxylene, vinylnaphthalene, mixtures thereof, etc. Useful diene components include, for example, diene compounds such as butadiene, isoprene, pentadiene, mixtures thereof, etc.

Typical examples of these thermoplastic styrene elastomers are hydrogenated diene polymers composed of a polybutadiene block segment and a styrene compound/butadiene copolymer block segment, hydrogenated diene polymers composed of a polyisoprene block segment and a styrene compound/isoprene copolymer block segment, block copolymers composed of a polymer block predominantly containing a styrene compound and a polymer block predominantly containing a conjugated diene compound, hydrogenated random copolymers composed of a styrene compound and a conjugated diene compound, and hydrogenated block copolymers composed of a polymer block predominantly containing a styrene compound and a polymer block predominantly containing a conjugated diene compound.

When the laminate film of the present invention is used for bags for containing a parenteral solution or bags for preserving blood platelets, it is suitable to use random copolymers of styrene with hydrogenated butadiene, block copolymers of polystyrene block with hydrogenated polyvinyl isoprene block, block copolymers of polystyrene block with polyvinyl isoprene block, etc. Among them, the copolymers containing 5 to 40% by weight of the styrene component are preferred. If the styrene content is more than 40% by weight, the resin is given excessive hardness and the film tends to become deficient in impact strength. On the other hand, if the styrene content is less than 5% by weight, the blocking resistance tends to decrease on the film surface and lower heat resistance is prone to result. These tendencies are closely related to the molecular weight of the polymer and are not clearly definable. For example, even if the styrene content exceeds 40% by weight, lower heat resistance results when the polymer has a low molecular weight. On the other hand, even if the styrene content is less than 5% by weight, high heat resistance results when the polymer has a high molecular weight. In other words, the styrene content of 5 to 40% by weight is merely a typical range to which the present invention is not limited at all.

The above examples of the thermoplastic styrene elastomer of the layer (B) can be used singly or in mixture with each other.

The proportions of the polyolefin and the thermoplastic styrene elastomer in the layer (B) are not specifically limited. For example, the former can be used in the proportion of 10 to 70% by weight, preferably 20 to 60% by weight, and the latter in the proportion of 90 to 30% by weight, preferably 80 to 40% by weight. If the proportion of the former exceeds 70% by weight, the impact strength tends to decrease, whereas if it is less than 10% by weight, the blocking resistance is likely to diminish on the film surface. However, these ranges are set forth merely as representative examples and are not essential in the present invention.

For applications as bags for preserving blood platelets, the laminate film of the invention comprises the same components as the film of the first-mentioned formulation except that a propylene resin is used in the layer (B) in place of the polyolefin. The proportions of the components used in this case are the same as described hereinbefore. Optionally it is possible to add, as a third component, any of polyolefins exemplified above for the layer (B) such as ethylene resins, butene resins and other thermoplastic resins, insofar as they do not adversely affect the properties of the bags. Among them, preferred are ethylene/vinyl acetate copolymers, ethylene/ethyl acrylate copolymers, ethylene/methacrylic acid copolymers, etc. which are also effective in increasing the high-frequency sealability of the film.

When required, the resin composition of the layer (B) may contain additives, fillers, etc. such as heat resistance stabilizers, antioxidants, light stabilizers, antistatic agents, lubricants, antiblocking agents, nucleating agents, flame retardants, pigments or dyes, calcium carbonate, calcium sulfate, barium sulfate, magnesium hydroxide, mica, talc, clay, etc. Further, other thermoplastic resins, thermoplastic elastomers, rubbers, etc. can be optionally added. Crosslinked products thereof can be also used.

When the film is used for containers for medicaments, bags for preserving blood platelets, etc., said additives and fillers may be dissolved out from the two outer layers. Accordingly their use should be avoided. If inevitably used, they should be used in a minimum amount.

The laminate film of the invention comprises a laminate of the layers (A), (B) alternately superposed. While the number of layers (A), (B) to be superposed is not essential in the invention, typical laminates comprise at least three layers, e.g. combinations of (B)/(A)/(B), (B)/(A)/(B)/(A)/(B), etc.

According to the invention, the layer (A) serves to impart flexibility to the laminate film as a whole. The crystalline polypropylene used gives heat resistance and stiffness to the film. The amorphous polyolefins used herein exhibit high surface tackiness. Particularly the polyolefins of low molecular weight are pronouncedly high in surface tackiness and should be used with care.

The layer (B) imparts drop impact resistance, flexibility, heat sealability and, if necessary, heat resistance to the laminate film and is therefore used as the two outer layers. On the other hand, the layer (A) is preferably used as an inner layer to render the laminate film flexible and free of surface tackiness.

The laminate film of the invention may have an additional resin layer of thermoplastic resin between the layers (A), (B). The resin layer may be composed of, for example, nylon, saponified ethylene/vinyl acetate copolymer, polyester, polyvinylidene chloride, etc. The type of resins to be used is not essential.

The third resin layer (hereinafter referred to as "layer (C)") can be incorporated into the laminate film of the invention in various combinations with the layers (A), (B). The combinations are, for example, (B)/(C)/(A)/(C)/(B), (B)/(C)/(A)/(B), etc. In this way, the third layer can be present between the intermediate layer and the two outer layers in the laminate film of the invention.

The laminate film of the invention and the layers thereof are not specifically limited in thickness and have a thickness optionally selected. Usually the overall thickness of the laminate film is in the range of about 15 to about 1,500 μm, preferably about 50 to about 1,500 μm, while the thickness of each layer is in the range of about 2 to about 1,000 μm. The thickness proportions of the layers (A), (B) are not critical. The thickness of combined layers (A) is adjusted to the range of about 20 to about 99%, preferably about 30 to about 95%, based on the thickness of the laminate film, since the layer (A) increases the flexibility of the film and the layer (B) reduces the surface tackiness.

Stated more specifically, when the laminate film of the invention is used for medical containers such as bags for parenteral solutions or bags for containing blood, the thickness proportions of a layer combination (B)/(A)/(B) are, for example, between 1/50/1 and 5/1/5. If the thickness of the layer (B) is less than in the proportions of 1/50/1, a lower impact strength is likely to result. However, if it is greater than in the proportions of 5/1/5, the obtained laminate film may be rendered less flexible due to a lesser proportion of the layer (A). Depending on the purpose, thickness proportions may be varied beyond said ranges.

In applications for bags for preserving blood platelets, the thickness proportions of a layer combination (B)/(A)/(B) are, for example, in the range of from 1/10/1 to 5/1/5. If the thickness of the layer (B) is less than in the proportions of 1/10/1, a lower impact strength is likely to result, whereas if it is greater than in the proportions of 5/1/5, the obtained laminate film may become less flexible due to a lesser proportion of layer (A) and its excess proportion is uneconomical. Depending on the process for treating the bag, thickness proportions outside said range may be employed.

Among the desired properties of bags for preserving blood platelets to be sustained in the preservation of platelets are a high permeability of oxygen through the bag for metabolism of platelets and a high permeability of carbon dioxide gas therethrough for discharge of $CO_2$ gas given off in the bag.

Since blood-containing bags are centrifuged to separate the blood into components, the bags need to remain free of marked deformation and rupture.

These bags need to have a total thickness of 200 to 400 μm to avoid said problem. If the total thickness is less than 200 μm, the bag may become ruptured during centrifugation, whereas if it is more than 400 μm, the bag may be disadvantageous from the viewpoints of economy and a low gas permeability. The bag can be of a total thickness outside said range depending on the process of such treatment.

As described above, the laminate film of the invention preferably has a high oxygen permeability and a high permeability of carbon dioxide gas when used as bags for preserving blood platelets. More specifically, the film has an oxygen permeability of at least 1.5, preferably at least 1.8 ($\times 10^3$ $cm^3/m^2/24$ hrs/atm), and a $CO_2$ permeability of at least 4.0, preferably at least 4.2, more preferably at least 4.5 ($\times 10^3$ $cm^3/m^2/24$ hrs/atm), as measured by the differential pressure method defined in JIS-K-7126A. However, these values are not critical and different values may be acceptable in the practice of the invention if the lifetime requirements permit.

The process for producing the laminate film or sheet of the invention is not specifically limited and includes, for example, a co-extrusion lamination method, lamination method, dry lamination method, etc. Of these methods, the co-extrusion lamination method involving welding by fusion is desirable. More specifically, the method comprises extruding a melt of materials using extruders matching a specific number of layers, laminating the melt in the conventional manner such as a T-die method or inflation method, and cooling the hot laminate by cooling rolls or with water cooling or air cooling.

The laminate film of the invention can be surface-treated to improve the printability and laminating properties of the film and the tackifier applicability. The surface treatment can be conducted by various methods such as corona discharge treatment, plasma treatment, flame treatment, acid treatment, etc. Any of these methods can be used in the practice of the invention. Preferred methods are plasma treatment, flame treatment and corona discharge treatment, because they can be continuously performed and can be easily carried out prior to a winding procedure in the process of forming films or sheets. Among the methods, the corona discharge treatment is the most preferred in view of its expedience. For applications which require the avoidance of blocking, the laminate film of the invention may be surface-treated, e.g. embossed, on one side or both sides. Further, the laminate film of the invention may be produced by involving monoaxially or biaxially stretching and by pressure forming or vacuum forming.

The laminate product of the invention is treated as above, if so required, after the lamination, cooling and solidification as set forth above and may be further processed for, e.g. printing, laminating, application of a tackifier, heat-sealing, etc.

While the laminate film of the invention per se described above and the laminate film having the intermediate layer of a third component are useful for various purposes, these films may be combined with a resin layer or a resin film to be superposed on one or both of outer layers in order to improve the mechanical strength, gas barrier properties, printability and other properties of the laminate film. The resin layer or resin film may be composed of polyester, nylon, vinylidene chloride, saponified ethylene/vinyl acetate copolymer, stretched polypropylene or the like.

For use as a protective film on a metal plate, plastics plate, glass plate and the like, cylindrical articles, etc., a tackifier may be applied on one side of the film or a modified resin may be used for an outer layer (B). In this case, the film may be bonded to the plate or article in the conventional manner.

The present invention will be described below in more detail with reference to the following examples and comparative examples. However, the invention is not limited to the examples at all.

The measurements were obtained by the following methods in the Examples.
(1) Tensile Strength and Tensile Elongation The tensile strength ($kg/cm^2$) and the tensile elongation (%) were determined by tensile tests according to JIS-K-6872.

(2) Haze (%)

Measured according to JIS-Z-8741

(3) Gloss (%)

Measured according to JIS-Z-8741

(4) Young's Modulus (kg/cm$^2$)

A sample of 25 mm in width was tested using a tensile tester set at a distance of 150 mm between chucks and at a rate of 25 mm/min.

(5) Drop Impact Test

A bag was produced by heat-sealing the edges on the four sides of two rectangular films, 13×17 cm. A sample was prepared by pouring 400 cc of water into the bag and heat-sealing the opening area of the bag. The sample was dropped, repeatedly five times, from a height of 2.5 m above the ground with a film surface directed in parallel with the ground. The bag was observed for leakage. The drop impact strength of the bag was evaluated as "A" if no leakage was detected in the 5-run test and as "B" if any leakage was detected, even once.

(6) Oxygen Permeability and $CO_2$ Permeability (×10$^3$ cm$^3$/m$^2$/24 Hrs/Atm)

Measured according to the differential pressure method defined in JIS-K-7126A

EXAMPLE 1

(1) Preparation of Resin Composition for Layer (A)

A resin composition for a layer (A) was prepared as follows. An amorphous polyolefin (product of Rexene Co., Ltd., trade name "REXTAC RT 2780") having a density of 0.86 g/cm$^3$, a melt viscosity (190° C.) of 10,000 cps, a propylene content of 65% by weight and a butene-1 content of 35% by weight was mixed with a crystalline polypropylene (product of Ube Ind., Ltd., trade name "B301H") having a density of 0.90 g/cm$^3$ and a melt flow rate (MFR) (230° C.) of 1.0 g/10 min in a weight ratio of 50/50. The mixture was melted and kneaded at 200° C. for 30 minutes, giving a resin composition.

(2) Preparation of Resin Composition for Layer (B)

A resin composition for a layer (B) was prepared as follows. An ethylene/propylene random copolymer (polyolefin) having a melting point of 142° C., a density of 0.90 g/cm$^3$, an MFR (230° C.) of 9.0 g/10 min and an ethylene content of 3% by weight was mixed with a hydrogenated styrene/isoprene random copolymer (thermoplastic styrene elastomer) having a density of 0.94 g/cm$^3$, a styrene content of 20% by weight and an MFR (200° C.) of 5.0 g/10 min in a weight ratio of 50/50. The molten mixture was kneaded by a twin-screw extruder, giving a resin composition.

(3) Molding of Laminate Film

The resin compositions prepared above for layers (A), (B) were charged into three independent extruders with three dies each connected thereto in order to give a film having a layer structure of (B)/(A)/(B) as an outer layer/intermediate layer/innermost layer (other outer layer) with the thicknesses as shown below in Table 1. The extrusion product was cooled by air-cooling using a cooling sizing ring, giving a tubular film by blow-down molding. The tubular film was taken off by a take-off at 40° C. and wound. The properties of the obtained 3-layer film were evaluated. The results are shown below in Tables 1 and 2.

EXAMPLE 2

A 3-layer film was produced in the same manner as in Example 1 with the exception of replacing the thermoplastic styrene elastomer used for the layer (B) in Example 1 with a hydrogenated styrene/butadiene random copolymer having a density of 0.89 g/cm$^3$, a styrene content of 10% by weight and an MFR (230° C.) of 3.5 g/10 min. The properties of the obtained 3-layer film were evaluated. The results are shown below in Table 1.

EXAMPLE 3

A 3-layer film was produced in the same manner as in Example 1 with the exception of mixing together the two components of the resin composition for an intermediate layer (A) in a ratio of 30/70. The properties of the obtained 3-layer film were evaluated. The results are shown below in Table 1.

EXAMPLE 4

A 3-layer film was produced in the same manner as in Example 1 with the exception of using a resin composition for a layer (B) comprising a mixture of (i) an ethylene/propylene random copolymer having a melting point of 144° C., a density of 0.90 g/cm$^3$, an MFR (230° C.) of 9.0 g/10 min and an ethylene content of 4% by weight (product of Ube Ind., Ltd., trade name "RF395"), (ii) a hydrogenated styrene/butadiene random copolymer, as a thermoplastic styrene elastomer, having a styrene content of 10% by weight and an MFR (230° C.) of 6.0 g/10 min, and (iii) an ethylene/vinyl acetate copolymer having an vinyl acetate content of 10% by weight in a weight ratio of 50/40/10. The properties of the obtained 3-layer film were evaluated. The results are shown in Tables 1 and 2. The resin composition for the layer (B) had a Vicat softening point of 60.0° C.

COMPARATIVE EXAMPLE 1

An ethylene/vinyl acetate copolymer having a vinyl acetate content of 15% by weight and an MFR (190° C.) of 2.0 g/10 min was molded by a conventional extrusion method into a single layer film having a thickness of 230 μm. The properties of the film were evaluated. The results are shown below in Tables 1 and 2.

COMPARATIVE EXAMPLE 2

A 3-layer film was produced in the same manner as in Example 1 with the exception of using, as a resin composition for a layer (B), only the ethylene/propylene random copolymer used in Example 1. The properties of the obtained 3-layer film were evaluated with the results shown below in Table 1.

EXAMPLE 5

The same procedure as in Example 1 was conducted with the exception of using a resin composition for a layer (B) comprising an ethylene/propylene random copolymer having a melting point of 144° C., a density of 0.90 g/cm$^3$, an ethylene content of 4% by weight and an MFR (230° C.) of 9.0 g/10 min (product of Ube Ind., Ltd., trade name "RF395"), and a styrene/isoprene block copolymer with a polyisoprene portion hydrogenated which copolymer had a styrene content of 20% by weight in a weight ratio of 40/60. The composition was melted and kneaded by a twin-screw extruder, giving a pelletized resin composition having a Vicat softening point of 62.0° C. A 3-layer film was prepared in the same manner as in Example 1 with the exception of using the pellets thus obtained and taking off the resulting film using a cooling roll at 60° C. The properties of the obtained 3-layer film were evaluated. The results are shown below in Tables 1 and 2.

TABLE 1

|  | Example | | | | | Comp. Ex. | |
| --- | --- | --- | --- | --- | --- | --- | --- |
|  | 1 | 2 | 3 | 4 | 5 | 1 | 2 |
| Film structure (μm) | | | | | | | |
| Innermost layer | 30 | 30 | 30 | 30 | 30 |  | 30 |
| Intermediate layer | 170 | 170 | 170 | 170 | 170 | 230 | 170 |
| Outer layer | 30 | 30 | 30 | 30 | 30 |  | 30 |
| Haze (%) | 2.5 | 3.4 | 2.2 | 2.1 | 3.2 | 0.9 | 2.5 |
| Gloss (%) | 126 | 131 | 132 | 126 | 125 | 144 | 126 |
| Tensile strength (kg/cm$^2$) | | | | | | | |
| LD*[1] | 170 | 198 | 238 | 185 | 184 | 176 | 237 |
| TD*[2] | 153 | 188 | 209 | 161 | 182 | 155 | 180 |
| Tensile elongation (%) | | | | | | | |
| LD | 818 | 923 | 810 | 754 | 783 | 765 | 720 |
| TD | 853 | 1043 | 820 | 769 | 858 | 801 | 790 |
| Young modulus (kg/cm$^2$) | | | | | | | |
| LD | 0.99 | 0.96 | 1.45 | 0.72 | 0.91 | 0.88 | 1.28 |
| TD | 0.96 | 0.95 | 1.43 | 0.73 | 0.93 | 0.78 | 1.25 |
| Drop impact resistance | A | A | A | A | A | B | B |

Notes
*[1]: LD = longitudinal direction
*[2]: TD = transverse direction

TABLE 2

|  | Overall thickness (μm) | Oxygen permeability (× 10$^3$ cm$^3$/m$^2$/ 24 hr/atm) | $CO_2$ permeability (× 10$^3$ cm$^3$/m$^2$/ 24 hr/atm) |
| --- | --- | --- | --- |
| Example 1 | 230 | 2.0 | 5.4 |
| Example 4 | 230 | 2.0 | 4.9 |
| Example 5 | 230 | 1.8 | 4.3 |
| Comp. Ex. 1 | 230 | 1.4 | 3.2 |

It was confirmed that the film obtained in Example 5 was dissolved out to an extent which complied with all items of the dissolved-out substance test in the standard of a blood set made of a vinyl chloride resin described in Pharmacopoeia of Japan. The film was made into a rectangular bag, 130×170 mm, by heat-sealing and 400 cc of a parenteral solution (electrolyte) was poured into the bag, followed by heat-sealing the opening area of the bag.

The bag containing the parenteral solution was tested as follows.
(1) Drop Impact Test
The bag was not ruptured.
(2) Steam Sterilization Test
The bag was subjected to steam sterilization in an autoclave under conditions of 115° C., 30 min; 121° C., 20 min; or 126° C., 15 min. The bag was not peeled off at the sealing area nor ruptured from the edge. No welding occurred on the inner surfaces of the bag.

The sample sterilized in the autoclave under conditions of 126° C., 15 min was used. The shrinkage factor of said sample was determined before and after autoclave sterilization. A difference in shrinkage factor was calculated as 2.2% in the longitudinal direction (extrusion direction) and 0.5% in the transverse direction. That is, it was confirmed that substantially no shrinkage occurred in either direction under said conditions.

The bag was checked also for the transparency after autoclave sterilization. It became slightly whitish immediately thereafter but the contents were easily visible through the bag. After standing for about 2 hours, the bag recovered substantially, although not completely, to the original transparency, and the blushing was conspicuously eliminated. Namely the bag was made ready for use free of problems.
(3) Dischargeability A bag containing a parenteral solution was obliquely suspended with one corner thereof fixed. The lowermost corner of the dangling bag was pierced with a needle (inner diameter 0.8 mm). It took 51 minutes until the solution dripped through the needle at a rate of less than about one drop per second. A 1.0% quantity of the solution remained in the bag after determining said period. The result showed that the solution was smoothly discharged from the bag, and substantially no problem was presented.

The evaluation results indicate that the laminate film of the invention is suitable for use as medical containers such as bags for containing parenteral solutions.

EXAMPLE 6

The film prepared in Example 5 was wound and was embossed on both sides to a surface roughness of 3.8 μm (Ra). Then the film was made into a rectangular bag, 135×115 mm and blood was poured into the bag, followed by heat-sealing at the opening area. The blood-containing bag was tested as follows.
(1) Centrifuging Test The obtained bag was subjected, repeatedly 5 times, to the action of a centrifuge ("KUBOTA 9810", product of Kubota Ltd.) set at 4,000 rpm for 10 minutes. The bag was not ruptured at all and caused little or no crease or deformation.

(2) Steam Sterilization

The bag was treated by autoclave steam sterilization at 121° C. for 20 minutes. The bag was not peeled off at the sealing area nor ruptured from the edge. The inner surfaces of the bag did not weld with each other.

(3) Oxygen permeability and $CO_2$ permeability

The bag was excellent in permeabilities of oxygen and carbon dioxide gas as seen also from Table 2.

(4) Dissolving-Out from Film

It was confirmed that the bag complied with all items of the dissolved-out substance test in the standard of a blood set made of a vinyl chloride resin described in Pharmacopoeia of Japan.

Using the same film as used hereinbefore for the blood-containing bag, 4 bags of the same size were produced. The following test was conducted using the bags thus produced.

Using a blood collecting device, platelet-rich plasma (PRP) was collected from 5,000 ml of blood of a healthy human. The PRP contained blood platelets at concentration of $1,843 \times 10^3$ platelets/μm. The PRP was divided into 10 ml, 20 ml, 30 ml and 37.5 ml portions, and the portions of PRP were poured into four test tubes. Fresh plasma of the same blood type was added in amounts to adjust the total amount of each group to 50 ml. The procedure gave four PRP samples containing platelets at progressively incremental concentrations of $4.0 \times 10^5$ platelets/μl, $7.46 \times 10^5$ platelets/μl, $11.0 \times 10^5$ platelets/μl and $13.7 \times 10^5$ platelets/μl, respectively. The PRP samples were aseptically poured into four bags as sterilized by autoclave treatment (121° C., 20 min), thereby giving 4 bags of PRP samples containing platelets at progressively incremental concentrations (Experiments Nos. 1 to 4 in Table 3). The bags were held with shaking at 22° C. for 24 hours and evaluated by the following procedures (A) and (B).

(A) The partial pressure of oxygen (mmHg) and the pH of the samples were measured using an apparatus for analyzing gases in the blood. The results are shown below in Table 3.

TABLE 3

| | Example 6 | | | Comparative Samples | | |
|---|---|---|---|---|---|---|
| Exp. No. | Blood platelet conc. ($\times 10^5$/μl) | Partial pressure of oxygen (mmHg) | pH | Blood platelet conc. ($\times 10^5$/μl) | Partial pressure of oxygen (mmHg) | pH |
| 1 | 4.0 | 136.9 | 7.438 | 3.9 | 139.6 | 7.471 |
| 2 | 7.46 | 92.3 | 7.385 | 7.4 | 79.8 | 7.346 |
| 3 | 11.0 | 38.4 | 7.320 | 10.5 | 33.2 | 7.278 |
| 4 | 13.7 | 21.4 | 7.282 | 13.5 | 30.9 | 7.116 |

FIG. 1 is a graph showing the measurements of partial pressure of oxygen.

(B) The remaining portions of the samples (only a small portion of each sample was consumed in the procedure (A)) were diluted with platelet-poor plasma (ppp) to a platelet concentration of $4 \times 10^5$ platelets/μl, giving 4 samples (Experiments Nos. 5 to 8 in Table 4).

Platelet aggregation-inducing materials (shown below) were added to the obtained samples to determine the platelet aggregation capacity using a Lumi-aggregometer. The results are shown below in Table 4.

Used as the platelet aggregation-inducing materials were 0.5 μg/ml, 2.0 μg/ml and 4.0 μg/ml of collagen and 3 μmol and 10 μmol of ADP (adenosine diphosphate).

TABLE 4

| | Example 6 | | | | Comp. Samples | | | |
|---|---|---|---|---|---|---|---|---|
| | Exp. No | | | | | | | |
| Additives | 5 | 6 | 7 | 8 | 5 | 6 | 7 | 8 |
| Collagen | | | | | | | | |
| 0.5 μg/ml | 14 | 13 | 10 | 10 | 14 | 15 | 12 | 11 |
| 2.0 μg/ml | 15 | 14 | 12 | 13 | 15 | 17 | 11 | 11 |
| 4.0 μg/ml | 72 | 78 | 86 | 52 | 79 | 51 | 69 | 54 |
| ADP | | | | | | | | |
| 3 μmol | 19 | 14 | 15 | 13 | 20 | 6 | 2 | 2 |
| 10 μmol | 40 | 46 | 38 | 38 | 40 | 25 | 24 | 21 |

The values in Table 4 are those of light transmittance (%).

The values were calculated by taking the light transmittance as 100% when no platelet (0%) existed in 100% plasma and as 0% when no aggregation occurred (0%).

Comparative samples were prepared in the same manner as above for the samples of the present invention, using bags (comparative bags) which were made from a film of non-rigid polyvinyl chloride of 380 μm in thickness conventionally used and which had the same size as the bags of the present invention. The comparative samples were evaluated by the same methods as the samples of the invention. The results are shown above in Tables 3 and 4 and in FIG. 1.

FIG. 1 is a graph showing the relationship between the platelet concentrations and the partial pressure of oxygen shown in Table 3. Referring to FIG. 1, the samples of Example 6 were compared with the comparative samples. FIG. 1 shows that in any of the samples, the higher the platelet concentrations, the lower the partial pressure of oxygen. This means that the higher the platelet concentrations, the more the consumption amount of oxygen. Further, the samples of Example 6 exhibited a higher partial pressure of oxygen. It is evident also from this fact that the laminate film of the present invention is desirable as a material for bags for preserving blood platelets. Yet, the comparative samples had a partial pressure of oxygen which was higher than the samples of Example 6 at a platelet concentration in the vicinity of $13.7 \times 10^5$ platelets/μl presumably because of the following reason.

The comparative samples had a constant partial pressure of oxygen at a platelet concentration of more than $11 \times 10^5$ platelets/μl. It is presumed that the platelets had a scanty supply of oxygen at said range of platelet concentrations. In other words, the platelets were presumably deteriorated in the function of receiving oxygen at said concentration range, namely malfunctioned. It is inferred from this fact that the comparative samples can preserve a maximum number of platelets in the range of approximately $11 \times 10^5$ (platelets/μl) $\times 50 \times 10^3$ (μl).

The samples of Example 6 had a partial pressure of oxygen remaining inconstant at a platelet concentration in the vicinity of $11 \times 10^5$ platelets/μl, and are considered to sustain a normal function of platelets. If the samples of Example 6 show a constant partial pressure of oxygen (21.4 mmHg) at a platelet concentration of more than $13.7 \times 10^5$ platelets/μl, the samples can preserve a maximum number of platelets in the range of approximately $14 \times 10^5$ (platelets/μl) $\times 50 \times 10^3$ (μl). This means that the bags of Example 6 are superior in preservability of platelets to the comparative bags. It is clear also from this fact that the laminate film of the present invention can achieve remarkable results when used as bags for preserving platelets.

The pH data in Table 3 show that the samples of Example 6 decreased in pH to a lesser extent than the comparative samples. This indicates that the bags of Example 6 preserved platelets better.

The following is seen from the data of platelet aggregation capacity in Table 4. The higher the values in Table 4, the better the platelet aggregation capacity, which means that the function of platelets was not impaired. The data show that among the samples containing 4.0 μg/ml of collagen or ADP, the samples of Example 6 were superior in platelet aggregation capacity to the comparative samples. This fact also demonstrates that the platelets were better preserved in the bags of Example 6.

The evaluation results indicate that the laminate film of the invention can produce good results when used also for bags for preserving blood platelets.

The laminate film of the invention as described hereinbefore is excellent in drop impact strength, heat sealability, hygienic properties, flexibility, etc. Therefore the laminate film of the invention can be desirably used as materials for packaging containers. It is especially advantageous that the film of the invention can exhibit such a high drop impact strength that the possibility of leakage during processing procedures and transport will be eliminated. Furthermore, when a resin composition of heat resistance is used for outer layers, the laminate film of the invention is usable for various medical containers requiring heat resistance as well as for bags for preserving platelets and has further advantages of preserving the contents for an extended period, exhibiting high permeabilities of oxygen and carbon dioxide gas, showing an unlikeliness to allow the degradation of contents and having hygienic qualities.

We claim:

1. A laminate film having at least three layers, the three layers being (A) an intermediate layer and (B) two outer layers, the intermediate layer (A) being composed of a resin composition comprising 20 to 100% by weight of an amorphous polyolefin copolymer of at least 50% by weight of at least one of a propylene and butene-1 and 80 to 0% by weight of a crystalline polypropylene, and the two outer layers (B) being composed of a resin composition comprising 30–50% of a ethylene-propylene random copolymer and 70–50% of a thermoplastic styrene elastomeric copolymer of styrene and at least one of butadiene and isoprene.

2. A laminate film according to claim 1 which is used as a material for medical containers.

3. A laminate film according to claim 1 which is used as a bag for preserving blood platelets.

4. A laminate film according to claim 1 wherein the thermoplastic styrene elastomeric copolymer comprises a hydrogenated copolymer of styrene and at least one of butadiene and isoprene.

* * * * *